May 11, 1965

L. RAMACHER ETAL 3,182,437

NUT HARVESTER

Filed May 13, 1963

INVENTORS
LESLIE RAMACHER
RUDOLPH H. RAMACHER
BY

Lothrop & West
ATTORNEYS

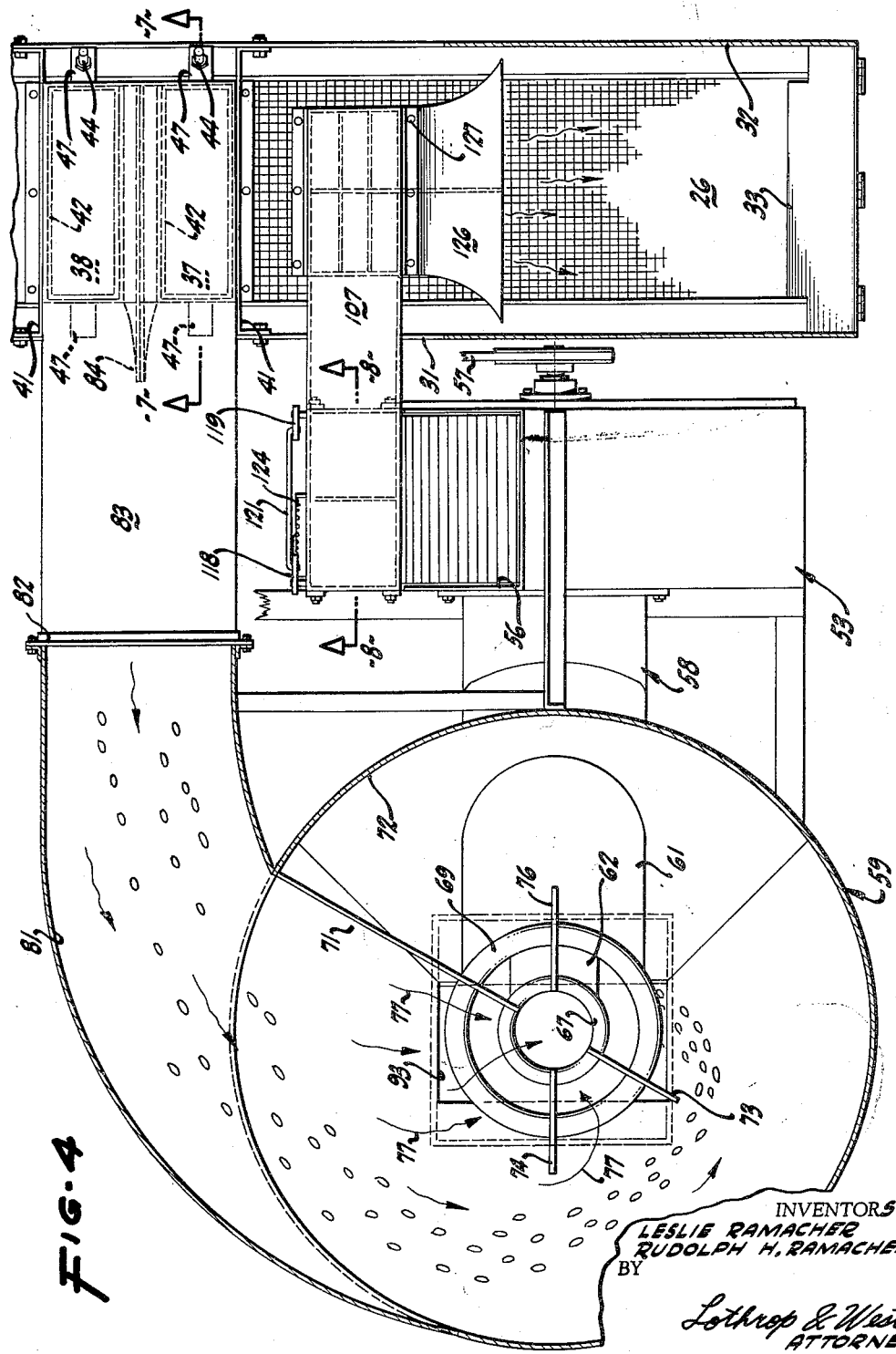

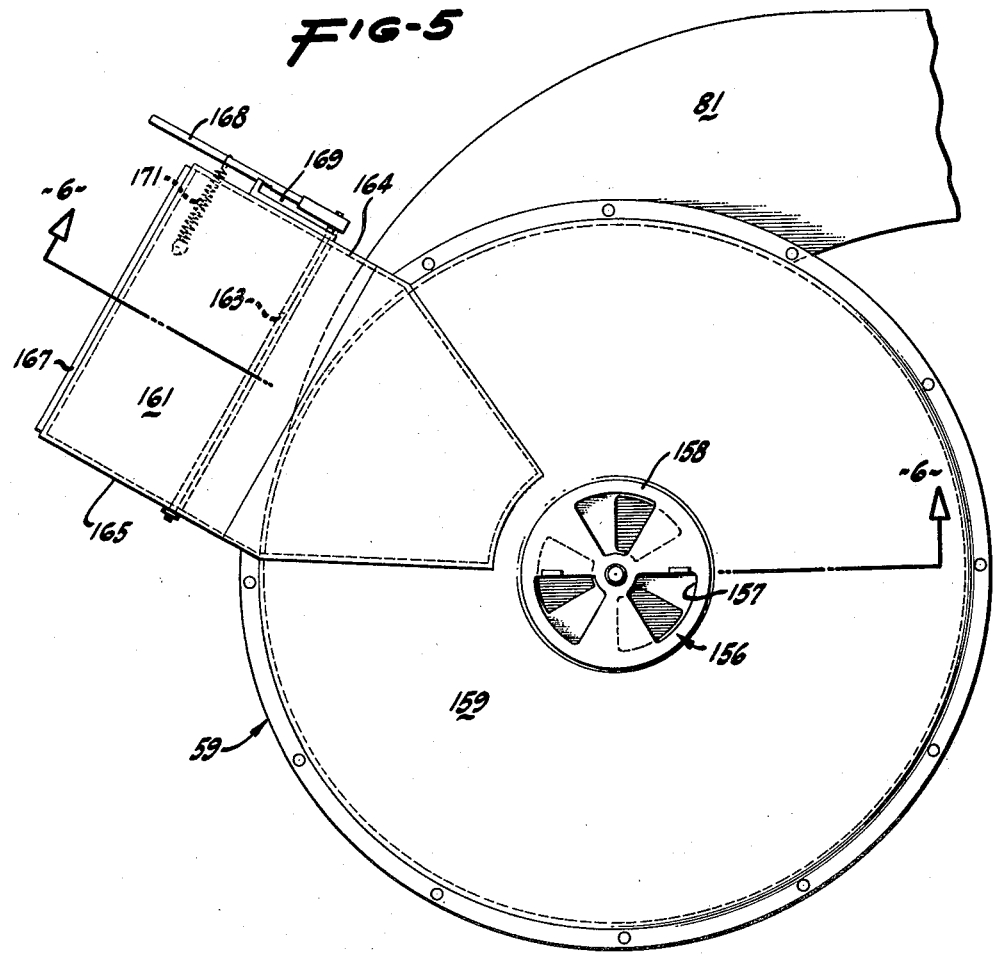
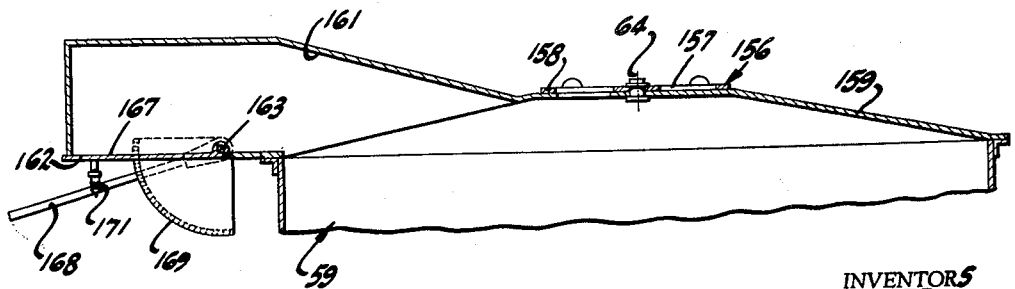

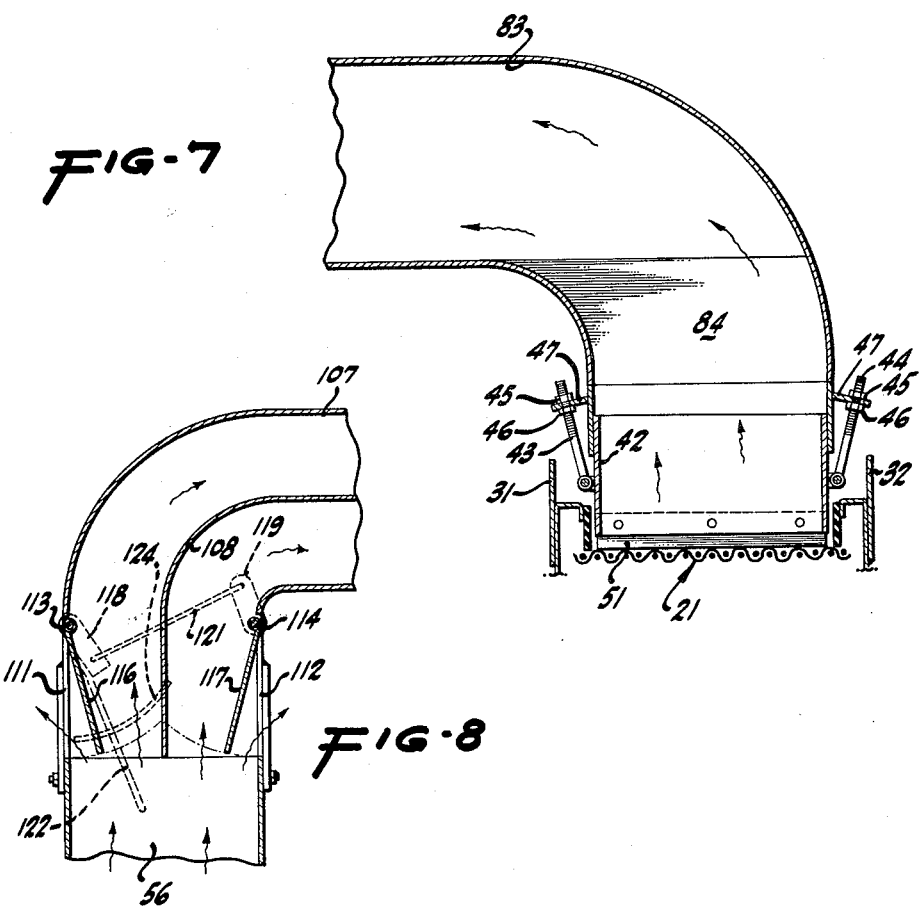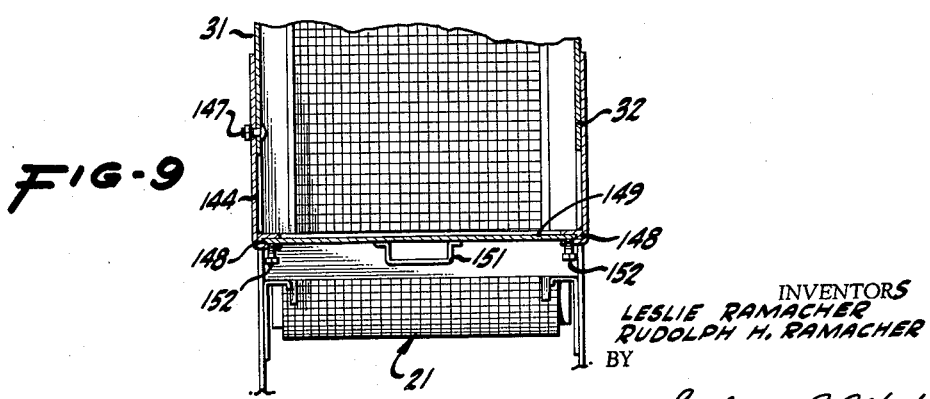

United States Patent Office 3,182,437
Patented May 11, 1965

3,182,437
NUT HARVESTER
Leslie Ramacher and Rudolph H. Ramacher, both of P.O. Box 506, Linden, Calif.
Filed May 13, 1963, Ser. No. 279,891
4 Claims. (Cl. 56—328)

Our invention relates to devices designed to be propelled over ground onto which nuts, particularly almonds, have been deposited either by natural fall or subsequent to shaking of the trees for harvest purposes. The machine is effective to pick up various materials from the ground. It gathers not only the nuts, but also a good deal of miscellaneous and unwanted material such as pebbles, small clods, hulls, twigs, leaves and comparable debris.

It is an object of our invention to provide a nut harvester in which substantially all of the available nuts are retrieved from the ground and in which the nuts are subsequently separated from substantially all of the unwanted material.

Another object of the invention is to provide a nut harvester operating largely with air currents and arranged so that the air currents can be varied to suit the operating circumstances.

Another object of the invention is to provide a nut harvester in which the air currents utilized are economically derived and directed.

Another object of the invention is to provide a nut harvester operated by an attendant in which the attendant has momentary control over the operation of the machine to meet varying harvesting conditions in the field.

An additional object of the invention is to provide a nut harvester in which unwanted material is separated from the wanted nuts early in the operation of the machine so as to reduce the handling of the unwanted material.

Another object of the invention is to provide a nut harvester which is almost entirely power operated and can be controlled by but a single attendant.

Another object of the invention is to provide a nut harvester in which the wanted nuts are carefully and expeditiously handled to avoid damage and loss.

A still further object of the invention is to provide a nut harvester which is generally an improvement over machines heretofore available for similar service.

Other objects together with the foregoing are attained in the embodiment of the invention described in the accompanying description and illustrated in the accompanying drawings, in which:

FIGURE 4 is a cross section, the planes of which are indicated by the lines 4—4 of FIGURE 3;

FIGURE 5 is a detail showing in plan a portion of the vortical air separator and attendant structures;

FIGURE 6 is a cross section, the planes of which are indicated by the lines 6—6 of FIGURE 5, portions of the figure being broken away to reduce its size;

FIGURE 7 is a detail showing part of the nozzle mechanism in cross section, the plane of section being indicated by the line 7—7 of FIGURE 4;

FIGURE 8 is a cross section showing a detail of the damper mechanism, the plane of section being indicated by the line 8—8 of FIGURE 4; and FIGURE 9 is a cross section of the waste discharge mechanism, the planes of section being indicated by the lines 9—9 of FIGURE 2.

Figure 1:
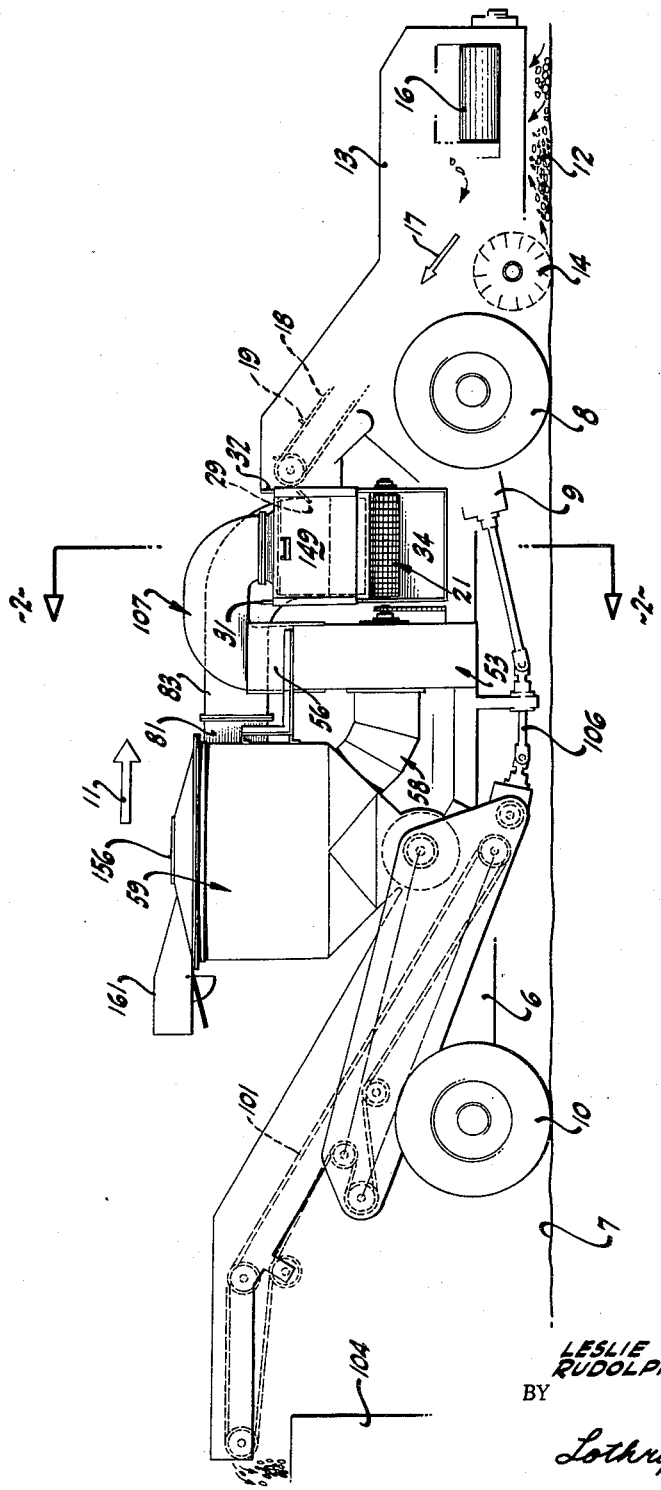
FIGURE 1 is a side elevation of a nut harvester constructed pursuant to our invention and shown as it is in operation in the orchard.

While the nut harvester of our invention can be embodied in a number of different ways, depending partially on the type and style of nut to be harvested and depending also upon the harvesting environment, it has successfully been incorporated substantially as shown herein.

In this embodiment, there is provided a frame 6 which is mobile in that it is supported on the ground 7 by a pair of leading drive wheels 8 appropriately driven by a motor, not shown, and including a drive box 9. The frame 6 is likewise supported by a trailing pair of dirigible wheels 10 so that an operator on the frame 6 when the engine is operating can advance the frame over the ground 7 in an appropriate direction as shown by the arrow 11.

Disposed on the ground 7 in advance of the frame 6 is loose material generally designated 12 and including wanted nuts, such as almonds, together with miscellaneous contaminating material and debris such as twigs, leaves, clods, stones and the like. This material 12 is picked up and gathered into the leading portion 13 of the structure by means which form no part of the present invention. The pickup means include various rotating dislodging devices 14 and conveyors 16, all of which are effective as the frame 6 advances over the ground to pick up substantially all of the loose material 12 and deliver it to an endless belt conveyor 18 ascending in the direction of the arrow 17 as it extends rearwardly of the machine. The belt conveyor 18 has a number of flights 19 or cleats thereon to lift and carry the loose material which falls off the cross-conveyor 16. The dislodging device 14 preferably comprises a helical sweep or brush (see FIG. 1) which rotates in a counter-clockwise direction so as to dislodge the loose material 12 from the ground 7 and impel this material onto the top of the cross-conveyor 16, from which location, as described above, the material drops onto the lower end, not shown, of the belt conveyor 18.

Figure 2:
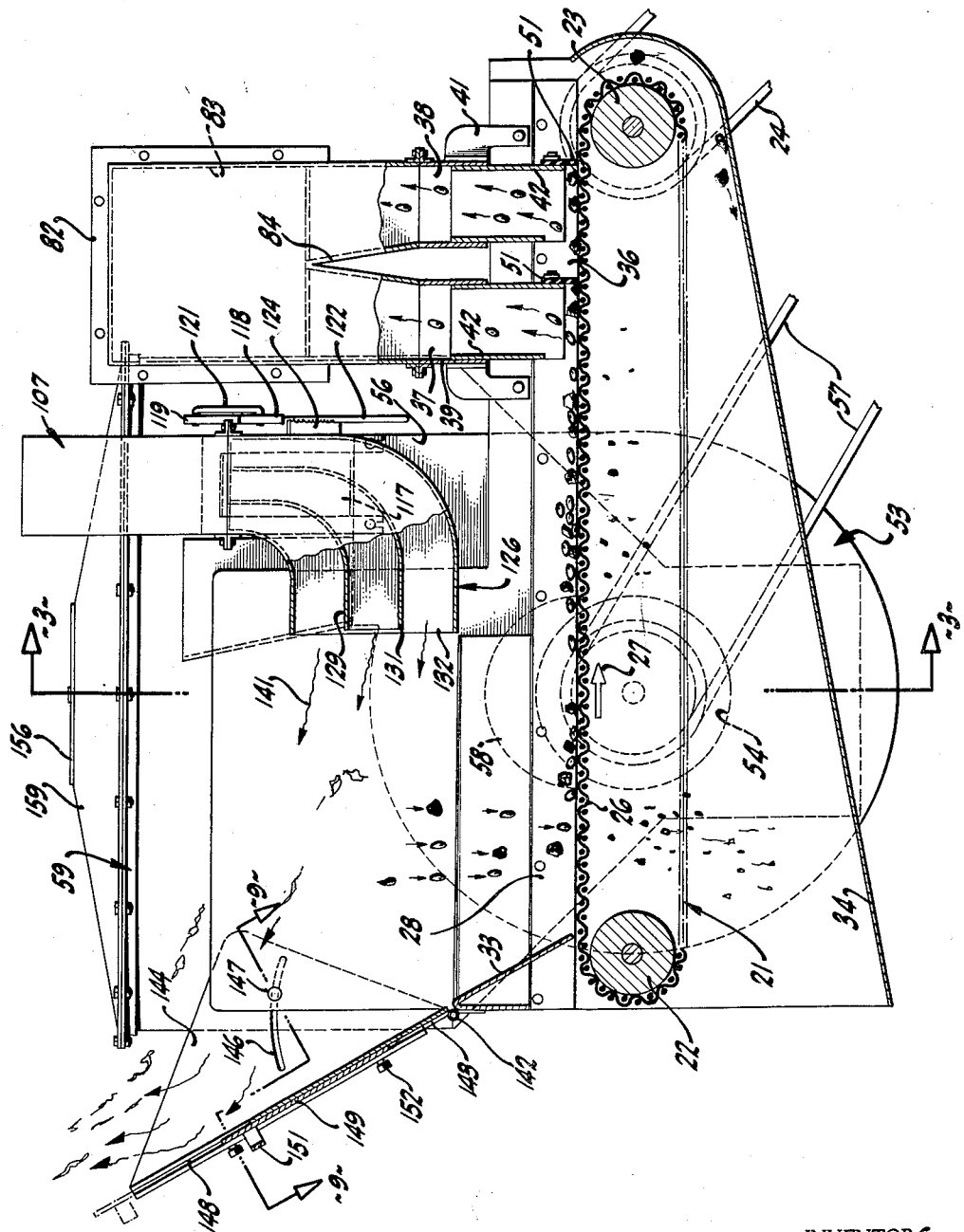
FIGURE 2 is for the most part a cross section, the plane of which is indicated by the line 2—2 of FIGURE 1.

Disposed on the frame 6 and extending substantially transversely thereof with respect to the direction of advance of the frame is a screen conveyor 21. This is primarily a reticulated belt or a web of foraminous material having openings of a suitable size to pass small pebbles or small clods of earth but to retain almonds or the desired nuts. The screen conveyor 21 is trained around end rollers 22 and 23 and is driven by a belt 24 or chain from the drive source. The screen conveyor is operated on the frame so that its upper run 26 travels in the direction of the arrow 27 in FIGURE 2.

The arrangement of the parts is such that the upper discharge end of the conveyor 18 (FIGURE 1) is situated at a substantial distance above the screen conveyor 21 and discharges into a partial enclosure immediately above a delivery station 28 on the upper run 26. The end of the conveyor 18 is adjacent a directing panel 29 so that heavy material discharged from the conveyor 18 and travelling over the panel 29 falls by gravity and in a generally vertical direction but with still some horizontal component to spread fairly evenly across the upper run 26 in the vicinity of the delivery station 28. The heavy material so discharged is partially confined by side plates 31 and 32 and also by an end plate 33 and is confined to the selected area of the conveyor 21.

Some of the heavy material falling onto the upper run 26 is so small in compass as to fall through the interstices in both the upper and lower runs of the screen conveyor and lands on a pan 34 at the bottom of the machine. Material in the pan discharges onto the ground in a windrow. The material which remains on the screen conveyor advances from the delivery station to a pickup station 36 in the vicinity of the roller 23.

At the pickup station are provided several intake nozzles 37 and 38. Each of the nozzles includes an upper trunk 39 supported on the frame 6 by a bracket structure 41. The nozzles 37 and 38 are each provided with a tubular nozzle extension 42. This is individually or separately mounted by a pair of pivoted adjusting bolts 43 and 44 locked in position by appropriate nuts 45 and 46 supported on brackets 47 extending from the trunk 39. In addition to being vertically adjustable, that is, toward and away from the screen conveyor, the individual nozzles each have trailing flexible lips 51 which yield to the passage of some materials but are effective to hold and retard other materials. Those materials which pass both of the nozzles and both of the flexible lips 51 round the end of the upper run of the screen conveyor and fall into the pan 34 for subsequent discharge.

Pursuant to our invention, we provide for a current of air to flow into the nozzles 37 and 38 and to induce the nuts to be harvested, such as almonds, to be entrained in the air flow and to leave behind heavier or bulkier materials, thus effectuating a partial separation. In accordance with this arrangement, there is mounted on the frame 6 a rotary air fan 53 having an axial air inlet 54 and a tangential air outlet 56. The fan is driven at an appropriate speed by means of a belt 57 operated from the source of power on the frame 6. The inlet 54 of the fan is connected through a dual duct 58 to the upper central portion of a vortical air separator 59. The dual duct 58 has an outer casing 61 and a substantially coaxial inner casing 62. The inner casing is supported by fins 63 from the outer one. The dual duct 58 terminates substantially coaxially with the vertical axis 64 of the vortical air separator.

Figure 3:
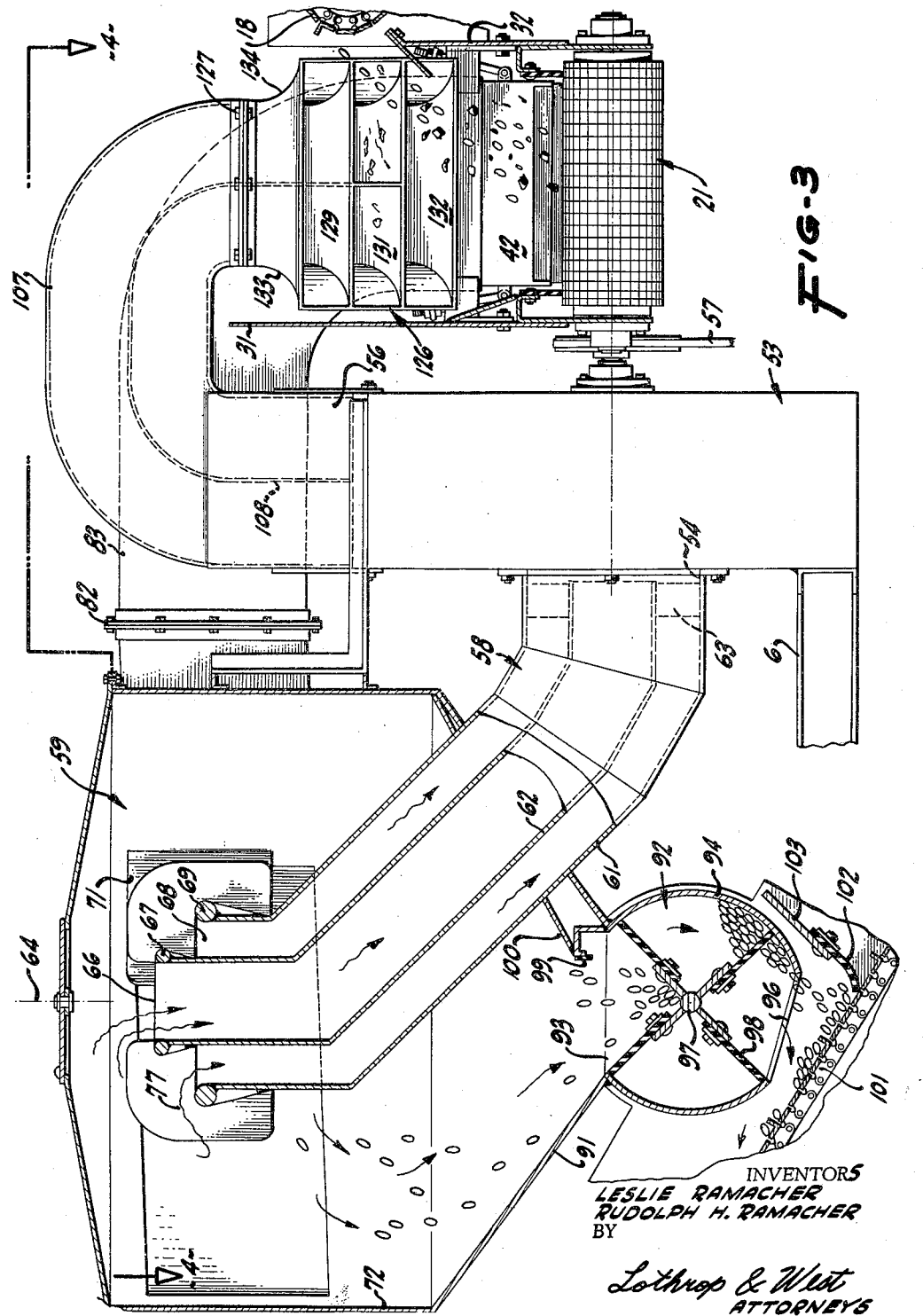
FIGURE 3 is a cross section, the plane of which is indicated by the line 3—3 of FIGURE 2.

The inlet opening 66 to the inner casing is bound by a ring 67 and the outer casing 61 has its lower inlet 68 bounded by a ring 69. This arrangement affords good air flow characteristics not only into the dual duct 58 but, because of the concentric casings, a good air flow with low turbulence to the inlet 54 of the fan for increased efficiency. The supporting fins 63 also act in a measure as straightening vanes for the inflowing air to increase the efficiency of the fan. The upper end of the dual duct 58 is additionally supported in position by a radial plate 71 extending from the cylindrical wall 72 of the vortical air separator. Coplanar with the plate 71 is a radial baffle 73 (FIGURE 4). Other radial baffles 74 and 76 are likewise provided. When the fan is operating, air from the interior of the vortical air separator flows substantially in the direction of the arrows 77 (FIGURES 3 and 4) into both parts of the dual duct 58 and into the fan.

Merging smoothly and approximately tangentially into the cylindrical wall 72 of the vortical separator is a connecting duct 81 having a flange connection 82 to a conduit 83 substantially square in cross section and finally turning downwardly and bifurcating at a central dividing wall 84 to merge with the divided nozzles 37 and 38 and so communicating with the nozzle extensions 42.

When the fan is operating, air is induced to flow into the vortical air separator 59 through the duct 81 and the conduit 83 and from the atmosphere immediately surrounding the entrance to the nozzle extensions 42. When the adjustments are properly made, the nuts at the pickup station 36 on the screen conveyor 21 are aspirated or induced to flow into the nozzle extensions 42 at a proper height to receive them. The nuts and some miscellaneous material flow upwardly through the nozzles 37 and 38 into the conduit 83 and thence through the tangential connecting duct 81 into the vortical separator.

The velocity of the flowing air and of the accompanying nuts is greatly decreased in the vortical separator. The effect of gravity and the drop in velocity cause the nuts to swirl in a somewhat helical or spiral path downwardly around the inside of the vortical separator and over the bottom cone 91 thereof. The air itself, not being so affected by gravity, retraces its course and again follows the arrows 77 into the dual conduit 58 for aspiration into the fan. If by chance some nuts entering through the tangential duct 81 travel close to the air inlets 66 and 68, they encounter the radial walls 71, 73, 74 and 76 and immediately lose their forward impetus and fall to the bottom of the separator. The radial walls act as deflectors and assist in the separation of the nuts from the carrying air currents.

Those nuts that have fallen to the bottom of the separator gather in an air lock 92 at the bottom. The air lock has a substantially rectangular entrance 93 and is a partially circular cylindrical housing 94 having an outlet opening 96 and carrying a central shaft 97. On the shaft and extending radially therefrom are flexible vanes 98, preferably of rubber, which fit well within the housing 94. The vanes divide the interior of the air lock into noncommunicating volumes so that the inlet 93 and the outlet 96 are never in direct communication. The air conditions within the vortical separator 59 can differ markedly from those in the surrounding atmosphere. As the vanes 98 revolve, they release the nuts at the bottom of the separator.

To prevent the nuts from being jammed or caught, a flexible lip 99 is mounted at the end of a false wall 100 in the bottom of the separator. The lip can yield, as can an adjacent radial vane, so that any intervening nut is not crushed, but is deposited in one or the other of the compartments between the vanes 98. As the vanes revolve, they sweep out and discharge the separated nuts through the opening 96 onto a chain conveyor 101 which travels in an upward direction. Retrograde flow of the nuts is prevented by a flexible barrier plate 102 depending from a cross wall 103. The conveyor 101 extends to a rearmost discharge at the trailing end of the frame 6 so that the nuts leaving the conveyor can be captured in a following bin 104 or the like. The air lock and the conveyor 101 are both appropriately driven from a drive shaft 106 connected to the source of power 9.

Air which is drawn into the fan 53 is tangentially discharged therefrom into a vertical duct 107 conveniently provided with a dividing wall 108 or septum to improve the air flow and to reduce turbulence, thus increasing the efficiency of the fan. The duct 107 makes an approximate U-turn and descends at a point above the central portion of the screen conveyor 21. At the initial upstanding portion of the duct 107, near the outlet 56 of the fan 53, a special damper or shunting arrangement is provided. The opposite side walls of the duct 107 are interrupted to provide openings 111 and 112 leading to the atmosphere. At their upper ends each of the openings is adjacent one of a pair of parallel cross shafts 113 and 114. Damper or deflector plates 116 and 117 are fast on the respective shafts 113 and 114 and so can swing from positions entirely occupying the openings 111 and 112 to positions approaching each other and in abutment with the central wall 108. The shafts 113 and 114 carry levers 118 and 119 joined by a rod 121 and the shaft 113 also carries an operating lever 122.

By appropriate operation of the lever 122, the deflector plate 116 and 117 can be moved into any desired position. In one extreme position, all of the air from the fan flowing through the outlet is diverted immediately to the atmosphere and none of it is transferred for travel into the conduit 107. In the other extreme position, the damper plates 116 and 117 completely occupy the openings 111 and 112, so that all of the air discharged by the fan is necessarily carried into and through the conduit 107. If desired, the lever 122 can cooperate with an appropriate frictional detent mechanism 124 having teeth in an arcuate array so that any manually set intermediate or extreme position of the damper plates can be held.

Air which travels through the conduit 107 is directed in a generally downward fashion and into a specially contoured outlet box 126. This is a separated housing secured by bolts 127 at a flanged joint and is internally divided by a plurality of curved walls 129 and 131 into several discharge orifices such as 132. Also, the contour of the discharge box is such that its side walls 133 and 134 flare outwardly as they approach the outlet orifices 132. The position of the box 126 is such that issuing air travels substantially in a horizontal direction or with a major horizontal component parallel to the upper run of the screen conveyor 21 and immediately between the side walls 31 and 32. The air issuing from the orifices 132, as indicated generally by the arrows 141, crosses the falling material discharging from the upper end of the loading conveyor 18. Consequently, light material such as leaves and comparable trash are intercepted just as they begin to fall from the end of the loading conveyor. They do not descend upon the screen conveyor at the delivery station, but rather are blown horizontally and with an upward component away from the machine.

The particular direction and point of discharge of the light, blown material is subject to regulation. Supported on the frame 6 is a cross shaft 142 carrying a rear gate 143 including side plates 144. These have arcuate slots 146 therein to receive frictional fasteners 147 adjustable with respect to their mounting in the side plates 31 and 32 so that the gate 143 can be disposed at any selected angle. In addition, the gate is made to include facing channels 148 in which a gate plate 149 is slidable. A handle 151 is provided for use in sliding a plate, whereas lock bolts 152 hold the plate in any extended position. Thus by appropriately setting the walls 144 and extending the gate plate 149, there can be afforded a position and location of discharge which is most efficacious.

Additional means are provided for controlling the air flow in the various air circuits so that the machine can be set for optimum operation to meet varying harvesting conditions. As particularly shown in FIGURES 5 and 6, there is preferably provided a circular damper 156 at the upper central portion of the vortical separator. This is the usual form of damper with segmented openings 157 which can be entirely or only partially closed by a rotating damper disk 158. When the damper disk is appropriately set, there is some air flow through the openings 157. Another air opening is afforded. Preferably the upper cone 159 of the vortical air separator is provided with an enlarged extension 161 having a bottom opening 162 therein. A shaft 163 extends between the side walls 164 and 165 of the extension and carriers a damper plate 167 which when closed completely blocks flow through the opening 162. On the shaft 163 is a control lever 168 operating against a ratchet quadrant 169 and impelled into holding position by a coil spring 171. By appropriately manipulating the lever 168, the plate 167 can assume any one of a number of positions between completely closed and completely open. The structure is such that when set the plate 167 stays in position despite vibrations of the device. By appropriately setting the lever 168 and the plate 167, the air conditions within the vortical air separator can be controlled. When the plate 167 is completely open, all of the air inspirated by the fan comes directly from the atmosphere through the opening 162 so that suction or air influx to the nozzles 37 and 38 is interrupted and they do not pick up anything.

In the operation of this machine, the various adjustments and positioning devices are appropriately set to meet the existing harvesting conditions. The nozzle extensions 42 are appropriately adjusted for position relative to the subjacent upper run 26 of the screen conveyor 21. The plate 167 and the damper plate 158 are arranged so that the air conditions within the vortical separator are proper. The plates 116 and 117 are set so that the discharge of air from the fan into the orifices 132 is appropriate to get rid of the trash, and the gate plate 149 is set at the appropriate angle and extension to afford a satisfactory discharge point.

While normally it is not necessary for the operator to vary the adjustments during operation, this is occasionally necessary, and consequently the levers 122 and 168 are themselves located close to the driver or with extensions so that he can readily change their locations during operation.

What is claimed is:
1. In a nut harvester having a frame for advancing over ground strewn with loose material including nuts, and means on the frame for picking up the loose material, the combination of:
   (a) a delivery station comprising a partial enclosure defined by a transverse foraminous belt movably mounted on the frame, a pair of side plates upstanding from the opposite edges of said belt, an outlet box at one end for the delivery of air across said enclosure and an inclined gate at the other end affording an outlet for the lighter components of the loose material dropped from above into said enclosure, said lighter components being blown outwardly through said gate by air discharging from said outlet box, said belt having openings large enough to pass the heavier components of the loose material which are smaller than nut size, said belt openings being small enough, however, to retain objects of nut size and larger;
   (b) a pickup station located at the discharge end of said transverse foraminous belt, said pickup station comprising a plurality of vertically adjustable intake nozzles above said belt, blower means for inducing the flow of air upwardly through said foraminous belt adjacent the bottom openings of said nozzles, and means for controlling the upward velocity of the air flow to afford a selective lifting from the surface of said foraminous belt and upwardly into said nozzles of objects having the specific gravity of the nuts and less, and a flexible lip adjacent said discharge end of said foraminous belt capable of flexing to pass objects having a specific gravity greater than that of the nuts and thus not removed by the air flow into said intake nozzles;
   (c) a vortical separator mounted on the frame, said separator being interposed between said nozzles and said air flow inducing means and being effective to separate the nuts from the material lighter than the nuts discharging from said intake nozzles;
   (d) a duct connecting said vortical separator to said air-flow inducing means for directing the discharge of air and any entrained material lighter than the nuts into said air-flow inducing means; and,
   (e) a duct connecting the discharge of said air-flow inducing means to said outlet box for movement of air and any lighter entrained material cross said partial enclosure and outwardly through said inclined gate into the atmosphere.

2. The combination of claim 1 further characterized by an air-lock at the bottom of said vortical separator to effect removal of the nuts separated therein.

3. The combination of claim 2 further characterized by means of said ducts and said separator for regulating the extent of air flow therethrough.

4. An apparatus for separating nuts from other loose material mixed therewith, said apparatus comprising:
   (a) a delivery station for the reception of the nuts and other loose material, said delivery station including a partial enclosure defined by an opening at one end and an air outlet box at the other end for the discharge of air across said enclosure, through the nuts and other loose material falling into said enclosure and outwardly through said opening and a moving foraminous belt on the bottom of said enclosure capable of supporting nut-size objects and larger;
   (b) a pickup station adjacent the discharge end of said belt and including a pair of vertical nozzles movable into close proximity to the subjacent nuts and lighter objects located on said belt;

(c) a vortical separator connected to said pickup station; and, (d) blower means having its intake connected to said vortical separator and its outlet connected to said outlet box at said delivery station, said blower means being capable of inducing an upward air flow through said nozzles to carry said nuts on said belt into said separator and being capable of creating an air current blowing through said outlet box and across said enclosure to pass out through said opening of said delivery station.

References Cited by the Examiner
UNITED STATES PATENTS

| | | | |
|---|---|---|---|
| 2,499,037 | 2/50 | Roles | 209—136 |
| 2,781,625 | 2/57 | Phelps et al. | 56—328 |

ANTONIO F. GUIDA, *Acting Primary Examiner.*

RUSSELL R. KINSEY, *Examiner.*